US012080328B1

(12) United States Patent
Rosenthal et al.

(10) Patent No.: US 12,080,328 B1
(45) Date of Patent: Sep. 3, 2024

(54) LIGHT-TRANSMISSIVE DATA STORAGE SANDWICH

(71) Applicant: Wave Domain LLC, Monson, MA (US)

(72) Inventors: Eric Dean Rosenthal, Landenberg, PA (US); Richard Jay Solomon, Monson, MA (US); Clark Johnson, Madison, WI (US)

(73) Assignee: Wave Domain LLC, Monson, MA (US)

( * ) Notice: Subject to any disclaimer, the term of this patent is extended or adjusted under 35 U.S.C. 154(b) by 0 days.

(21) Appl. No.: 17/803,676

(22) Filed: Oct. 11, 2022

(51) Int. Cl.
*G11B 7/257* (2013.01)
*G06F 3/06* (2006.01)

(52) U.S. Cl.
CPC ............ *G11B 7/257* (2013.01); *G06F 3/0679* (2013.01)

(58) Field of Classification Search
None
See application file for complete search history.

(56) References Cited

U.S. PATENT DOCUMENTS

| 4,835,090 A * | 5/1989 | Sawyer | G03C 1/76 430/367 |
|---|---|---|---|
| 6,151,287 A * | 11/2000 | Labeyrie | G11B 7/24 |
| 6,661,762 B1 * | 12/2003 | Verbakel | G11B 20/10527 |
| 8,891,344 B1 * | 11/2014 | Rosenthal | G11B 7/24044 365/216 |
| 9,330,706 B1 * | 5/2016 | Rosenthal | G11B 7/257 |
| 2002/0057902 A1 * | 5/2002 | Song | H04N 19/60 375/E7.211 |

* cited by examiner

*Primary Examiner* — Peter Vincent Agustin
(74) *Attorney, Agent, or Firm* — Sunstein LLP

(57) ABSTRACT

The present invention teaches a methodology and apparatus for data storage using elements of data sets stored as standing waves of a plurality of wavelengths in an optical photosensitive medium. A selector chooses the locations wherein the combinations of standing waves are stored. The medium is read in transmission mode with select standing waves acting as notch filters.

9 Claims, 8 Drawing Sheets

Exemplary Illustrations for Exposing & Storing Two Combined Standing Waves

Exemplary Illustrations for Exposing & Storing Two Combined Standing Waves

Data Storage & Reader Apparatus

Depicting how the sequential wavelength illuminator separates the discrete wavelengths for the data processor for storing data.

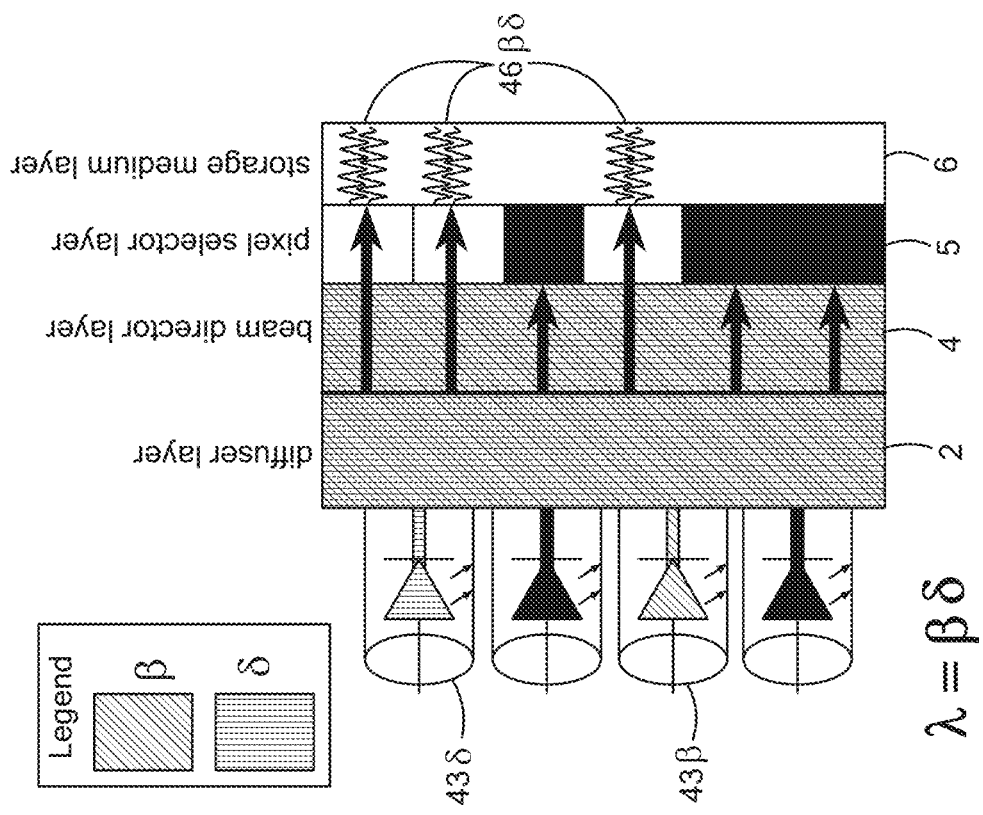
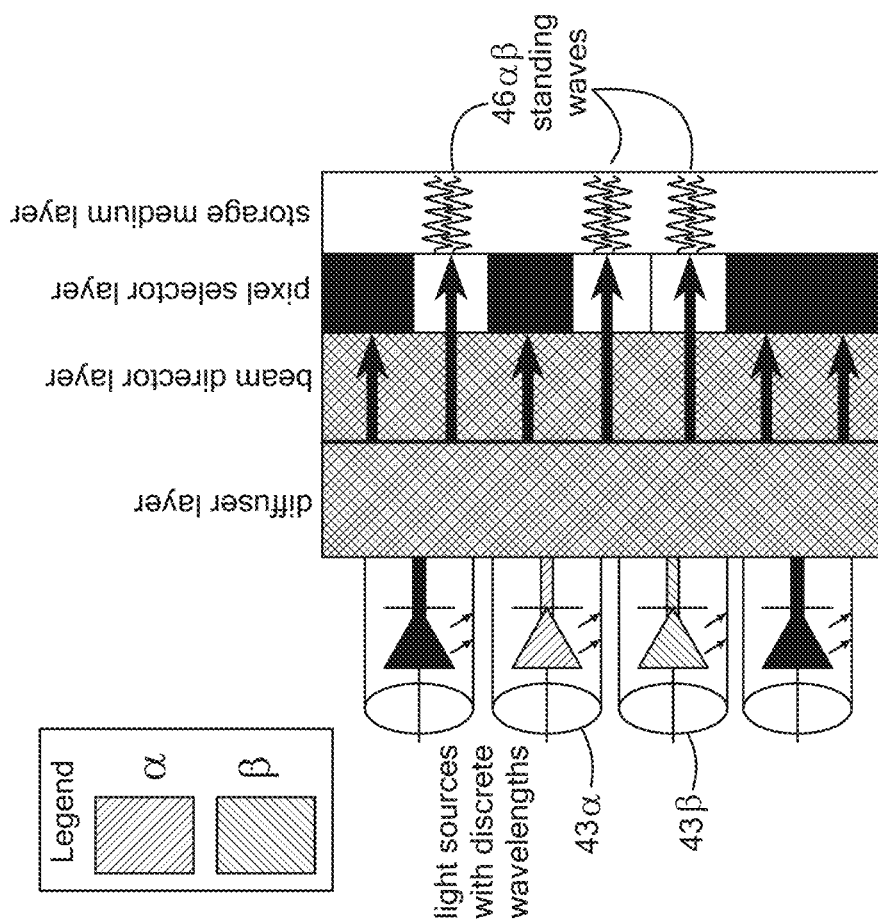

Flow Diagram for Storing Data on Medium

Flow Diagram for Reading Data from the Medium

LIGHT-TRANSMISSIVE DATA STORAGE SANDWICH

The present application claims the benefit of provisional application Ser. No. 63/360,506, filed Oct. 12, 2021, which is hereby incorporated herein by reference in its entirety.

TECHNICAL FIELD

The present invention relates to high-density, long-term, permanent, archival data storage, and more particularly to data storage using standing lightwaves embedded in a photosensitive emulsion—i.e., an optical data storage medium layer.

BACKGROUND ART

It is known in the prior art that the wavelengths of light can be captured in silver halide photographic emulsion in the form of embedded standing waves, with a wave's nodal points physically representing the wavelength. In 1908, Gabriel Lippmann won the Nobel Prize in Physics "for his method of reproducing colours photographically based on the phenomenon of interference" (quoted on the Noble Prize website at http://nobelprize.org/nobel_prizes/physics/laureates/1908/). This technique was first described in 1891 to store and extract color information from specially constructed black and white photographic plates (Lippmann, G., "La Photographic des Couleurs," *Compte Rendes a l'Academie des Sciences*, Tome 112, pp. 247-275, February 1891). The process was never commercialized successfully because of the difficulties of viewing the color image, reproducing the image beyond its first iteration on a glass plate, and the rudimentary, extremely slow photographic chemistry at the time.

Our previous patents, U.S. Pat. No. 8,891,344 B1, and U.S. Pat. No. 9,330,706 B1, describe how the Lippmann process is used to store and read data, embedded in the optical data storage medium layer as standing waves, in reflection mode. In particular, our previous patents disclosed converting digital data into standing waves, which are stored in an emulsion medium layer that is exposed using reflected light.

SUMMARY OF THE EMBODIMENTS

Unlike the technology disclosed in our previous patents, embodiments of the present invention utilizes transmission mode. In one embodiment, the invention provides a method of storing digital data in the optical data storage medium layer. In this embodiment, the method includes:
  receiving the digital data;
  parsing the digital data into successive packets to be stored in the optical data storage medium layer;
  processing the successive packets (i) to select successive sets of wavelengths to be used in encoding successive pixels associated with the successive packets, and (ii) to identify a set of distinct pixel locations in the optical data storage medium layer corresponding to each distinct one of the successive sets of wavelengths, so that each distinct pixel location is associated with an assigned set of wavelengths;
  for each selected set of the successive sets of wavelengths,
    (a) establishing a mask of the optical data storage medium layer to allow exposure only of pixel locations assigned to such selected set of the successive sets of wavelengths and (b) exposing the optical data storage medium layer through the mask using light of such distinct one of the successive sets; and,
  in the course of exposing the optical data storage medium layer, doing so in a manner wherein standing lightwaves are formed in the optical data storage medium layer.

In another embodiment, the invention provides a light-transmissive data storage sandwich apparatus for storing digital data in an optical data storage medium layer. In this embodiment, the apparatus includes:
  a set of monochromatic light sources of preselected wavelengths;
  a diffusing layer, coupled to the set of monochromatic light sources, configured to uniformly distribute light from the light sources;
  a beam directing layer having an output surface, the beam directing layer coupled to the diffusing layer, configured to redirect light from the diffusing layer in a direction perpendicular to the output surface;
  a pixel selector layer, having an output surface, the pixel selector layer coupled to the output surface of the beam directing layer and configured to define a mask that selectively inhibits transmission of light, on a pixel-by-pixel basis, at a wavelength of interest; and,
  an optical data storage medium layer (which may be implemented as a Lippmann emulsion) applied to output surface of the pixel selector layer.

In yet another embodiment, the invention provides a light-transmissive data storage sandwich apparatus for reading digital data in an optical data storage medium layer. In this embodiment, the apparatus includes:
  a set of light sources of select predetermined wavelengths;
  a diffusing layer to uniformly distribute light from the light sources;
  a beam directing layer having an output surface, the beam directing layer coupled to the diffusing layer, configured to redirect light from the diffusing layer in a direction perpendicular to the output surface, and to the exposed optical data storage medium layer containing the standing waves acting as notch filters;
  a pixel selector layer which in reading mode is transparent;
  an exposed optical data storage medium layer on which has received the select predetermined wavelengths;
  a sensor layer to detect the select pixel locations; and
  the reconstituted original data directed to an output port.

In related embodiments, the optical data storage medium layer is selected from the group consisting of a Lippmann emulsion, a photopolymer medium, an holographic medium, and combinations thereof.

A first process coupled to the parsed digital data input that selects the light emitters of unique wavelengths; and,
  a second process, coupled to the first process, that controls the pixel selector layer wherein the light source, the first process, and the second process are configured to cause the light source to select uniquely the wavelength light emitters and the locations on the pixel selector layer to expose the optical storage medium layer in a manner corresponding to the parsed digital data, creating in the optical data storage medium layer standing waves corresponding to each unique successive sets of wavelengths, so that each distinct pixel location is associated with an assigned set of wavelengths.

In one embodiment of the invention for reading data includes an apparatus comprising:
  light sources comprised of a plurality of unique wavelength emitters;

a diffusing layer;
a beam director layer;
the photosensitive, transparent fine-grained optical data storage medium layer.

A third process, which sequentially activates each individual wavelength light emitter to expose that specific wavelength in the optical data storage medium layer representing the image pattern as stored in the processor; and, which is repeated for each of the unique wavelengths.

Multiple wavelength parameters are used as input to a permutation algorithm(s) with each plurality of wavelengths representing different parameters. The multiple wavelengths in each data storage location can represent one or more unique data words when processed by the permutation algorithm.

In an exemplary embodiment of the invention, a set of four unique narrowband wavelengths out of a palette of n wavelengths are applied. Each wavelength represents an element in the set of n wavelengths; and when processed by the permutation algorithm(s) in a control processor the set represents data.

In one embodiment of this invention the methodology for reading the optical storage medium layer is in transmission mode, wherein the recorded standing waves act as notch filters as known in the art, attenuating selected wavelengths to identify the location of individual pixels which have notch filters for each of the select wavelengths.

A fourth process uses the permutation algorithm(s) to reconstitute the original data from the stored image maps.

In one embodiment of the invention, the optical storage medium layer is applied to the rear (output) surface of the pixel selector layer.

In one embodiment of the invention, the diffusing layer and the beam director layer are one element.

In another embodiment of the invention, the pixel selector layer (with the optical storage medium layer on its rear surface) is a removable optical storage medium module from a WORF ("Write Once, Read Forever") sandwich apparatus. This permits photographic-type development of the optical storage medium layer.

In a related embodiment of the invention, the diffusing layer, the beam director layer and the pixel selector layer (with the optical storage medium layer on its rear surface) are bonded together as a unit to perform the function of a removable data storage medium module.

In another embodiment of the invention, the beam director layer is a collimated-fiber bundle bonded to the output surface of the diffusing layer. This causes the diffused light to be redirected perpendicularly to the optical data storage medium layer.

The apparatus and methodology as described may be used for applications other than data storage and archiving, wherein the frame map stores an unique pattern, e.g., for security, encryption-decryption, blockchain authentication, etc.

BRIEF DESCRIPTION OF THE DRAWINGS

The foregoing features of embodiments will be more readily understood by reference to the following detailed description, taken with reference to the accompanying drawings, in which:

FIGS. 4A and 4B are exemplary illustrations demonstrating the path of light to simultaneously expose and store two wavelengths in accordance with an embodiment of the present invention.

DETAILED DESCRIPTION OF SPECIFIC EMBODIMENTS

Figure 1:
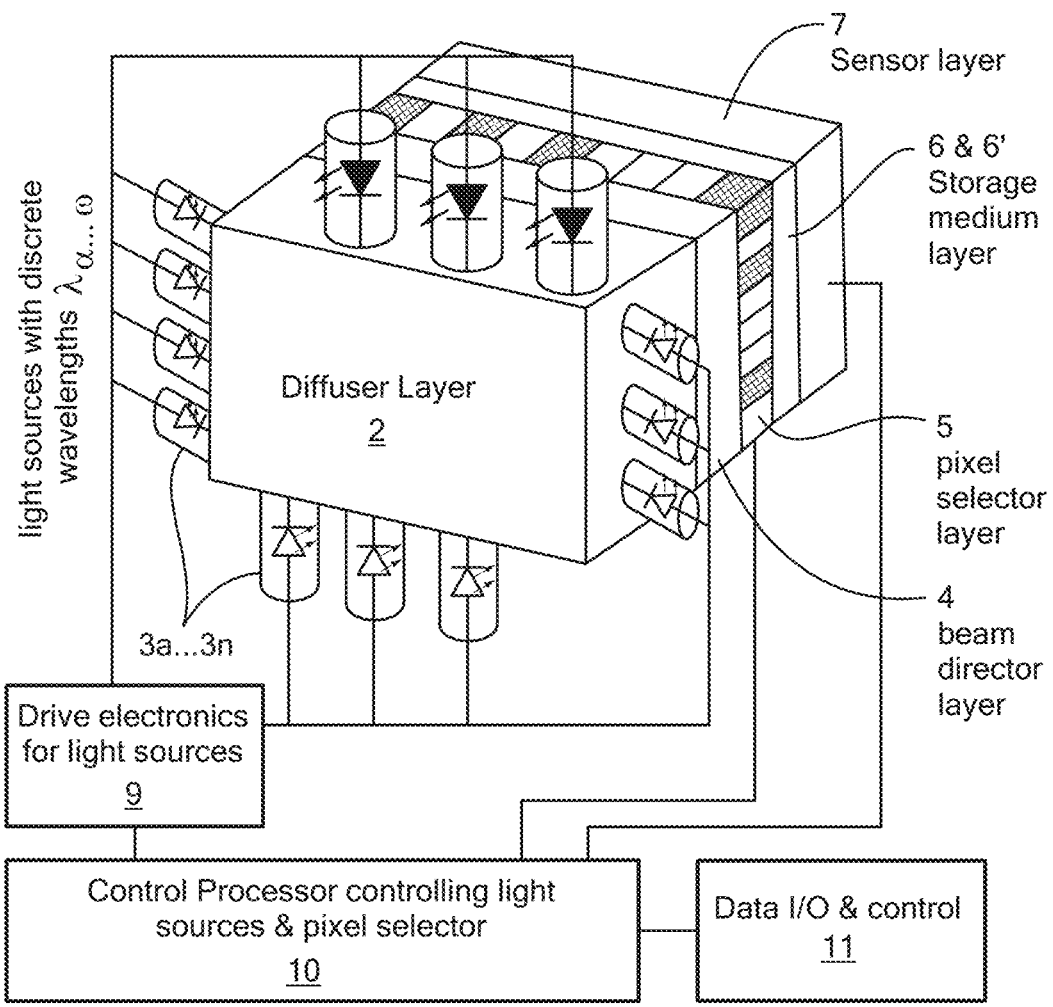
FIG. 1 shows the major components and their interconnectivity for a light-transmissive data storage and reader sandwich apparatus in accordance with an embodiment of the present invention.

Definitions. As used in this description of the invention and the accompanying claims, the following terms shall have the meanings indicated, unless the context otherwise requires:

A Light-Transmissive Data Storage Sandwich is a multi-layered apparatus having two configurations: one for storing data, and one for reading data. In its storing configuration, the apparatus operates to expose the photosensitive, transparent, fine-grained optical data storage medium layer (e.g, a Lippmann emulsion), and in its reading configuration the apparatus operates to extract previously stored data from the emulsion. In its configuration for storing data, the sandwich includes: (1) a diffusing layer that emits light emanating from a selected set of narrowband light sources (for example LEDs); (2) a beam director layer that aligns light from the diffusing layer, so as to be perpendicular to the next layer; (3) a pixel selector layer (e.g., an LCD) to selectively block the transmission of light through the sandwich on a pixel-by-pixel basis; and (4) the optical data storage medium layer to be exposed so as to store data. In its configuration for reading data, the sandwich includes: (a) a diffusing layer that emits light emanating from a selected set of narrowband light sources (e.g., LEDs); (b) a beam director layer that aligns light from the diffusing layer, so as to be perpendicular to the next layer; (c) a pixel selector layer (e.g., an LCD set to be transparent in the reading configuration); (d) the exposed and processed optical data storage medium layer (which is now storing data) and, (e) a sensor array (e.g., a CCD device).

A Lippmann emulsion is a photosensitive, fine grained chemical composition such as silver halide, with an average grain size of 8 to 30 nanometers, dispersed in a substance such as gelatin. In an embodiment of the present invention, this transparent composition is deposited in a thin emulsion (the optical data storage medium layer) on the rear (output) surface of a transparent substrate. After exposure, chemical development as known in the art (a) oxidizes and darkens grains according to standing wave nodes in a select wavelength, (b) dissolves all the unexposed grains representing the standing wave troughs in the select wavelength, (c) stabilizes the medium layer preventing further changes due to exposure to light. After processing as described the darkened grains represent the standing wave nodes of each select wavelengths in the emulsion. The resultant darkened nodal points physically represent the standing waves frozen in time as stored in the optical data storage medium layer.

A Pixel Selector is a monochromatic display acting as a shutter masking select pixel locations (one example is an LCD display panel such as a Chitu Systems FHD 5.5 MONO LCD, (Chitu Systems Room 301, Building 2, Zhigu Midtown Future Industrial Park, Hangcheng Street, Sanwei Community, Hangcheng Street, Baoan District, Shenzhen, China, Phone: +86-0755-23103569; Email: support@cbd-3d.com).

To "establish a mask" of a light-transmissive data storage sandwich medium layer to allow exposure only of pixel locations assigned to a selected set of successive sets of wavelengths includes using a pixel selector to define the mask. The pixel selector may be used as a substrate on which the optical data storage medium layer (e.g., the Lippmann emulsion) is applied to the output surface of the pixel selector. Alternatively, the optical data storage medium layer may be applied to a distinct substrate distinct from the pixel selector.

A Memory Module consists of a pixel selector layer acting as a substrate with the optical data storage medium layer on its rear (output) surface.

A Light Source is a narrow-bandwidth unique wavelength (e.g., a lasing diode).

A Standing Wave is generated by a forward electromagnetic wave in the optical domain transmitted through the entry surface of the memory module and reflected from exit surface of the emulsion due to an index of refraction mismatch.

A Pixel Location is a location in the memory module wherein the standing waves of different wavelengths are stored.

A Frame is a group of pixel locations.

A Frame Map is a set of frames to be exposed at specific pixel locations.

A Packet is a unique set of data related to the pixel locations to be encoded for creating image maps.

A Diffusing distributes light uniformly over its surface from the light sources.

A Beam Director receives the diffused light and redirects it perpendicular to the optical data storage medium layer surface (one example may be a Schott Fused Imaging Fiber Optics faceplate (SCHOTT North America, Inc., 2 International Drive, Suite 105, Rye Brook, NY 10573 USA, +1-914-831-2200).

A Sensor is a planar array image capture device. One example may be a CCD or CMOS sensor (such as an 8 megapixel lightwave sensor, part number NOIX2SN8000B-LTI, from On Semiconductor, 5005 East McDowell Road, Phoenix, AZ 85008 USA, Telephone: +1-602-244-6600).

A Write-Format Converter is a computer process configured to convert incoming digital data for driving a light-transmissive data storage sandwich so as to expose the associated optical data storage medium layer for storing the incoming digital data as a multi-wavelength image map.

A Read-Format Converter is a computer process for driving a light-transmissive data storage sandwich so as to read a multi-wavelength image map stored in the associated optical data storage medium layer and to convert the image map into a digital data output.

A Color palate is a range of wavelengths (colors) of interest chosen by the control processor to activate the appropriate light sources.

A Notch Filter is an optical device which selectively rejects light of a specific wavelength while transmitting all other wavelengths. In this context, the notch filter is configured to reject only light having the specific wavelength representing the digital data of interest.

A Computer Process is the performance of a described function in a computer system using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process," we do not necessarily require a schedulable entity, or operation of a computer program or a part thereof although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

Introduction: This invention teaches an alternate methodology for storing and reading the standing waves in transmission mode, with wavelengths at select data storage locations acting as notch filters for reading, as defined herein and described in FIGS. 3 and 5, as known in the art.

DESCRIPTION AND DEFINITION OF COMPONENTS AS DEPICTED IN FIGS. 1 THROUGH 7

2. Lightwave diffusion plate layer,
3a . . . 3n. Light sources, each with its own unique wavelength represented as $\lambda_{\alpha \ldots \omega}$;
4. Beam director layer to direct lightwaves perpendicular to pixel selector layer 5, and to optical data storage medium layer 6 and 6';
5. High-resolution, monochromatic pixel selector layer (e.g., a liquid crystal display (LCD) panel) defining the location of pixels within a frame;
6. Unexposed optical data storage medium layer, deposited on rear (output) surface of pixel selector layer 5 furthest from diffusion plate layer 2;
6'. Photographic processed optical data storage medium layer on rear (output) surface of pixel selector layer 5 furthest from diffusion plate layer 2;
7. Sensor layer, a high-resolution planar array image capture device (e.g., a CCD or CMOS device);
9. Drive electronics for fast switching of each light source.
10. Control Processor controlling light source drive electronics 9, pixel selector layer 5, sensor array layer 7, and digital input/output 11;
11. Digital input/output data to be stored or retrieved, and control signals.
30. An example of an exposure time sequence $t_1 \ldots t_4$ for activating sensor time blocks $37\alpha \ldots 37\delta$, as described below;
31. The data storage location array comprising the wavelength image map embedded in the optical data storage medium layer;
36 (and $36\alpha \ldots 36\delta$). Medium layer, identical to 6' after photographic processing;
37 (and $37\alpha \ldots 37\delta$). Sensor layer as time blocks $t_1 \ldots t_4$, equivalent to sensor layer 7;

38α ... 39δ. The image map array to be detected by the sensor layer (37α ... 37δ) when the light source is transmitted through optical data storage medium layer 36α ... δ, showing wavelengths attenuated due to the notch filtering mechanism, 43α, 43β, and 43δ. Unique select light sources 3a ... 3n, having unique wavelengths represented as $\lambda_{\alpha\ldots\omega}$;

46αβ and 46βδ. Examples of combined standing waves represented as $\lambda_{\alpha\ldots\omega}$ at select frames in emulsion layer 6;

53α ... γ. Unique select light sources, identical to 3a ... 3n, having unique wavelengths represented as $\lambda_{\alpha\ldots\omega}$;

56α ... γ. Optical data storage medium layer containing standing waves of select wavelengths α ... γ, acting as notch filters;

57α ... γ. Sensor layer identical to sensor layer 7; and

58α ... γ. Individual image maps for each wavelength $\lambda_{\alpha\ldots\gamma}$ to be stored in processor 10.

Figure 6:
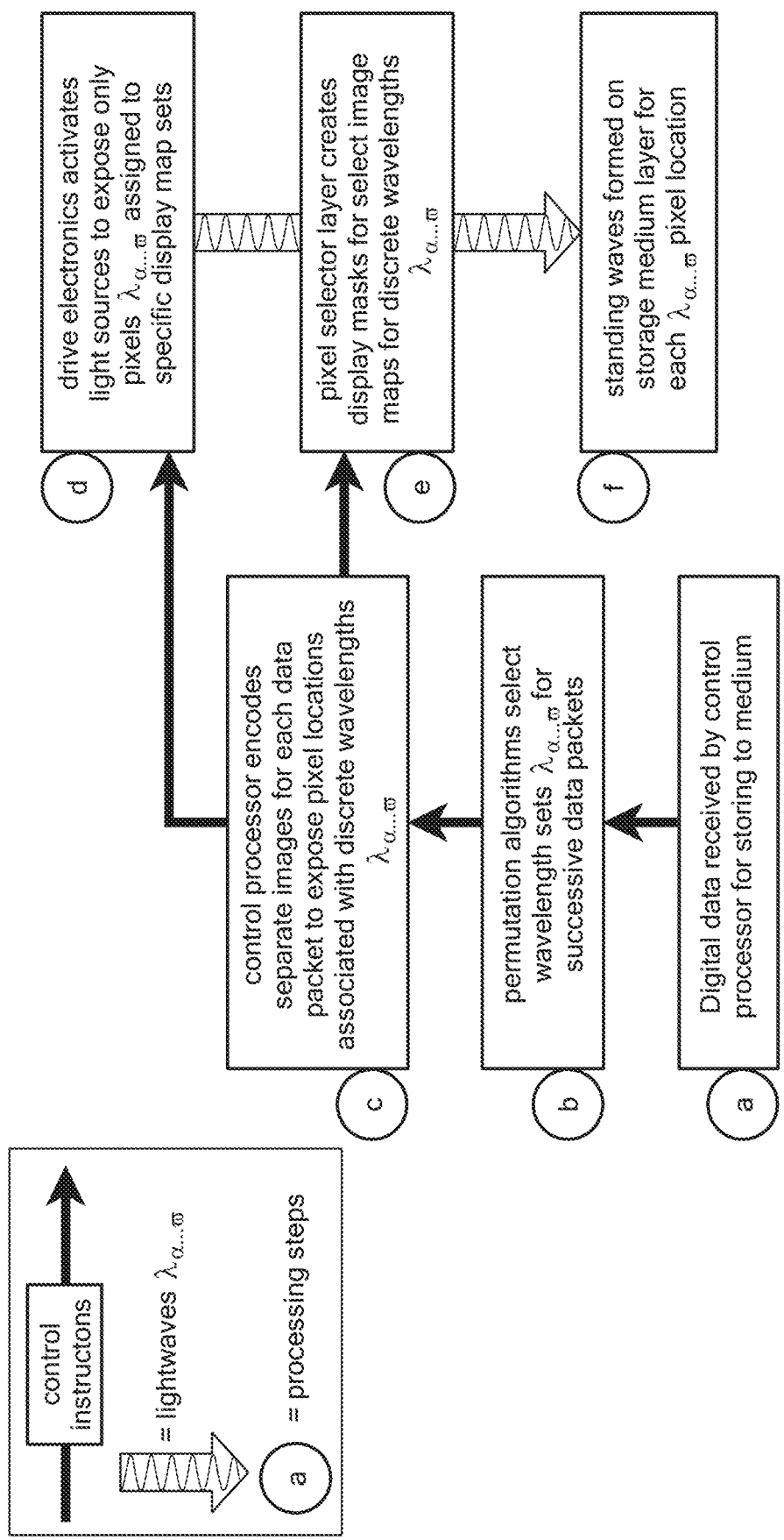
FIG. 6 is a flow diagram illustrating the processing steps for storing data on the optical data storage medium in accordance with an embodiment of the present invention.

FIG. 1 shows the major components and their interconnectivity for a data storage and reader sandwich apparatus in accordance with an embodiment of the present invention. In one embodiment of the invention, FIG. 1 illustrates a data storage and reader light-transmissive data storage sandwich apparatus depicting the individual components of the physical assembly identified by numbers 2 ... 11. FIG. 6 is a flow diagram illustrating the processing steps for storing data, identified by items (a ... f). For storing, digital data (a) is received from data I/O port 11 to control processor 10. Permutation algorithms (b) in control processor 10 (i) select successive sets of wavelengths $\lambda_{\alpha\ldots\omega}$ to be used in (c) encoding successive pixels associated with the first packet, and (ii) to identify in medium layer 6 a set of pixel locations corresponding to each distinct successive sets of wavelengths $\lambda_{\alpha\ldots\omega}$, so that each distinct pixel location is associated with an assigned set of wavelengths. Control processor 10 simultaneously sends signals (i) to (d) drive electronics 9 to allow the exposure of optical data storage medium layer 6 of only pixels assigned to such distinct one of the successive sets of wavelengths $\lambda_{\alpha\ldots\omega}$, and (ii) to pixel selector layer 5 (e) to mask the optical storage medium layer to allow exposure only of pixel locations assigned to such selected set of the successive sets of wavelengths $\lambda_{\alpha\ldots\omega}$. Light sources 3a ... 3n expose optical data storage medium layer 6 in a manner wherein (f) standing lightwaves are formed, as referenced in U.S. Pat. No. 8,891,344 B1. Lightwaves from each of the light sources 3a ... 3n are coupled to diffusion layer 2 to distribute the light from light sources 3a ... 3n evenly across the entire surface area of beam director layer 4. Beam director layer 4 redirects the lightwaves causing them to emerge perpendicular to pixel selector layer 5. This process is repeated for each distinct one of the successive sets of data packets and associated combinations of wavelengths $\lambda_{\alpha\ldots\omega}$ for each image map until all pixel locations have been exposed on optical data storage medium layer 6. For example, in accordance with an embodiment of the present invention, FIG. 4A illustrates a first data packet combination image map simultaneously illuminating light sources 3a and 3b, representing wavelength combination 43α and 43β. In accordance with an embodiment of the present invention, FIG. 4B illustrates a second data packet combination illuminating light sources 43β and 43δ, representing wavelengths β and δ. This iterative process generates standing waves for each successive sets of wavelengths $\lambda_{\alpha\ldots\omega}$ for each of the pixel locations in medium layer 6.

In one embodiment of the invention, medium layer emulsion 6 is applied to the rear surface of pixel selector layer 5, i.e., the output surface furthest from diffusion plate 2.

In a related embodiment of the invention, medium layer emulsion 6 is applied to the rear (output) surface of a separate transparent substrate (not shown).

In a further embodiment the exposures for each wavelength $\lambda_{\alpha\ldots\omega}$ are adjusted by processor 10 to compensate for the sensitivity of the emulsion to different wavelengths.

Figure 7:
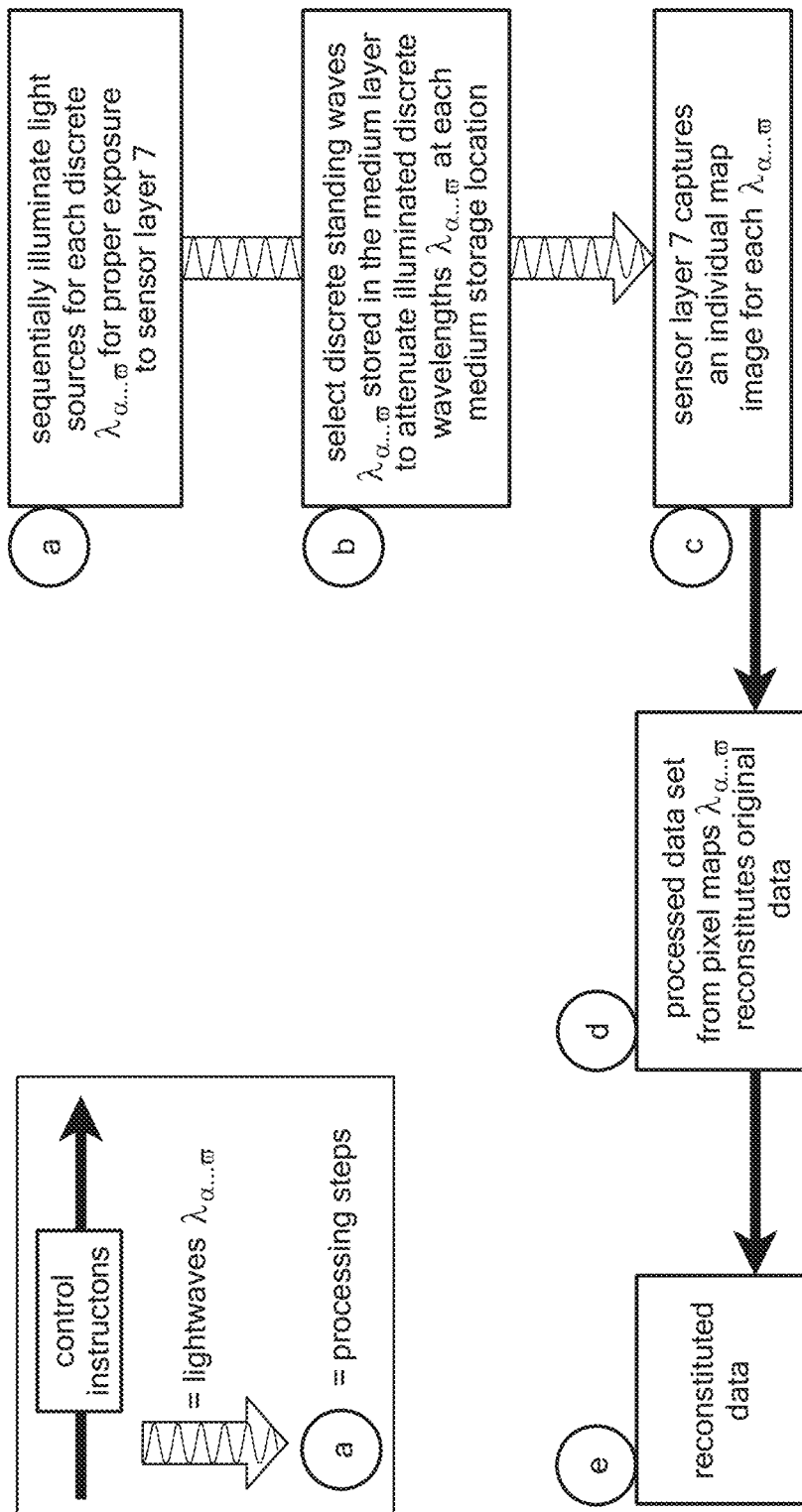
FIG. 7 is a flow diagram illustrating the processing steps for reading data from the optical data storage medium layer in accordance with an embodiment of the present invention.

In accordance with an embodiment of the present invention, FIG. 7 is a flow diagram illustrating the processing steps for reading data, identified by items (a ... f). For reading data, processor 10 sends commands to light source drive electronics 9 to (a) sequentially illuminate light sources 3a ... 3n for each $\lambda_{\alpha\ldots\omega}$. Lightwaves from each of light sources 3a ... 3n are coupled to diffusion layer 2 to distribute the light from light sources 3a ... 3n uniformly across the entire surface area of beam director layer 4. Beam director layer 4 redirects the lightwaves causing them to emerge perpendicular to optical data storage medium layer 6'. Standing waves $\lambda_{\alpha\ldots\omega}$ stored in optical data storage medium layer 6' act as (b) notch filters attenuating specific wavelengths $\lambda_{\alpha\ldots\omega}$ at each data storage location on the optical data storage medium layer 6'. Image sensor layer 7 captures an individual pixel map image (c) for each wavelength $\lambda_{\alpha\ldots\omega}$ and is stored in processor 10. Processor 10 compares (d) each of the stored images from captured pixel maps $\lambda_{\alpha\ldots\omega}$ assembling the elements of each pixel map, and then reconstitutes the elements into the original input data. The reconstituted data (e) is then passed to data I/O port 11.

In a related embodiment of the invention while reading, pixel selector layer 5 is clear.

In a further related embodiment of the invention while reading, pixel selector layer 5 is black, acting as a shutter when the sensor is not capturing an image.

In a further embodiment of the invention, the light sources for each wavelength $\lambda_{\alpha\ldots\omega}$ are adjusted by processor 10 to compensate for the variable absorption of the notch filters.

Figure 2:
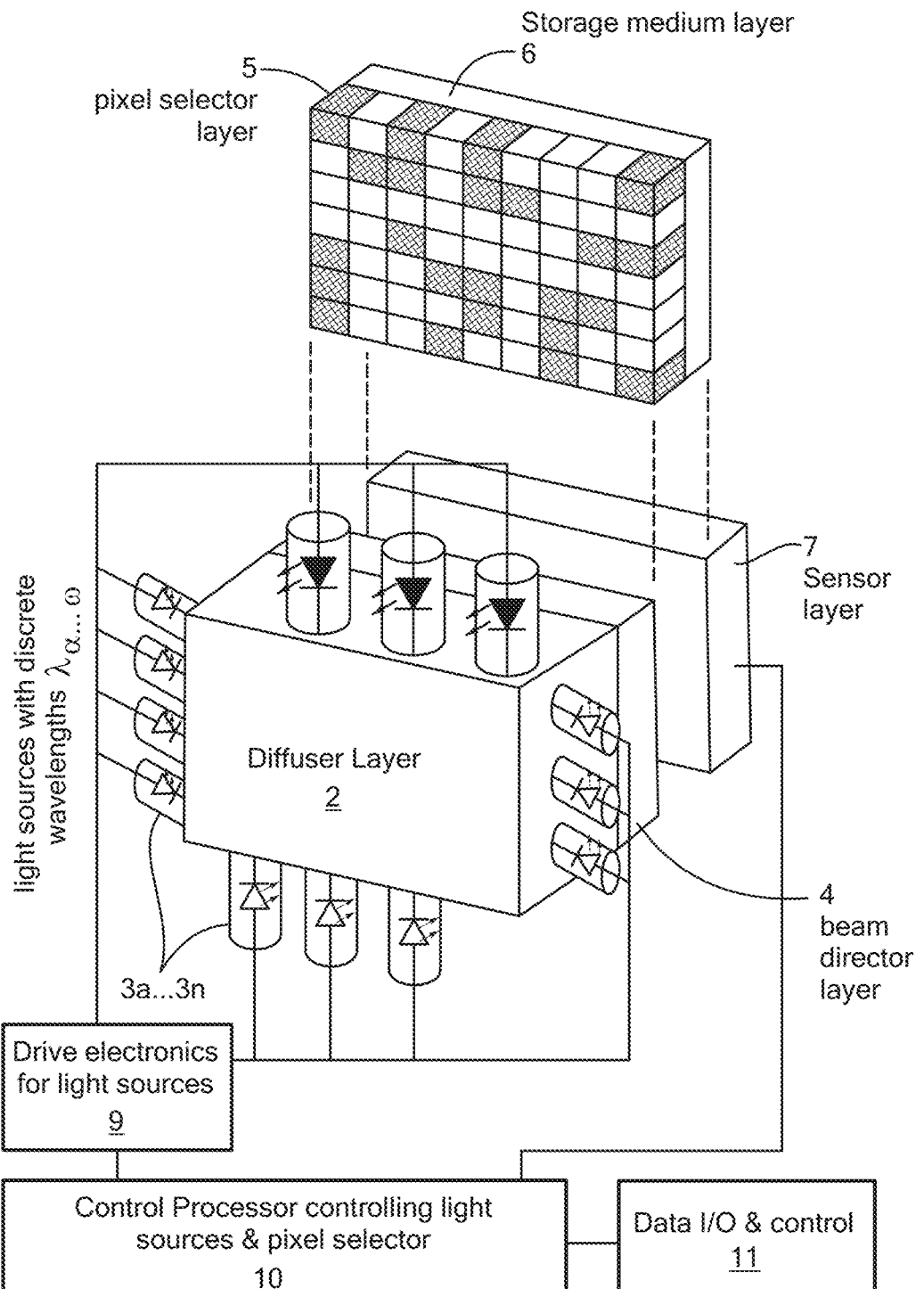
FIG. 2 illustrates one method for how the medium module may be removed from the apparatus in accordance with an embodiment of the present invention.

In accordance with an embodiment of the present invention, FIG. 2 shows how, after standing waves are stored in the WORF optical data storage module, including pixel selector layer 5 with the optical data storage medium layer 6 on its rear (output) surface, the module may be removed for optical data storage medium processing or offline storage from the WORF sandwich apparatus consisting of diffusing layer 2, light sources 3a ... 3n, beam director layer 4, and sensor layer 7.

In a related embodiment of the invention (not shown), after standing waves are stored in the optical data storage medium layer, and the optical data storage medium layer is processed, the removable WORF optical data storage medium module, including its emulsion layer, may remain bonded with diffusing layer 2 and beam director layer 4. In this embodiment sensor layer 7 is not present.

Figure 3:
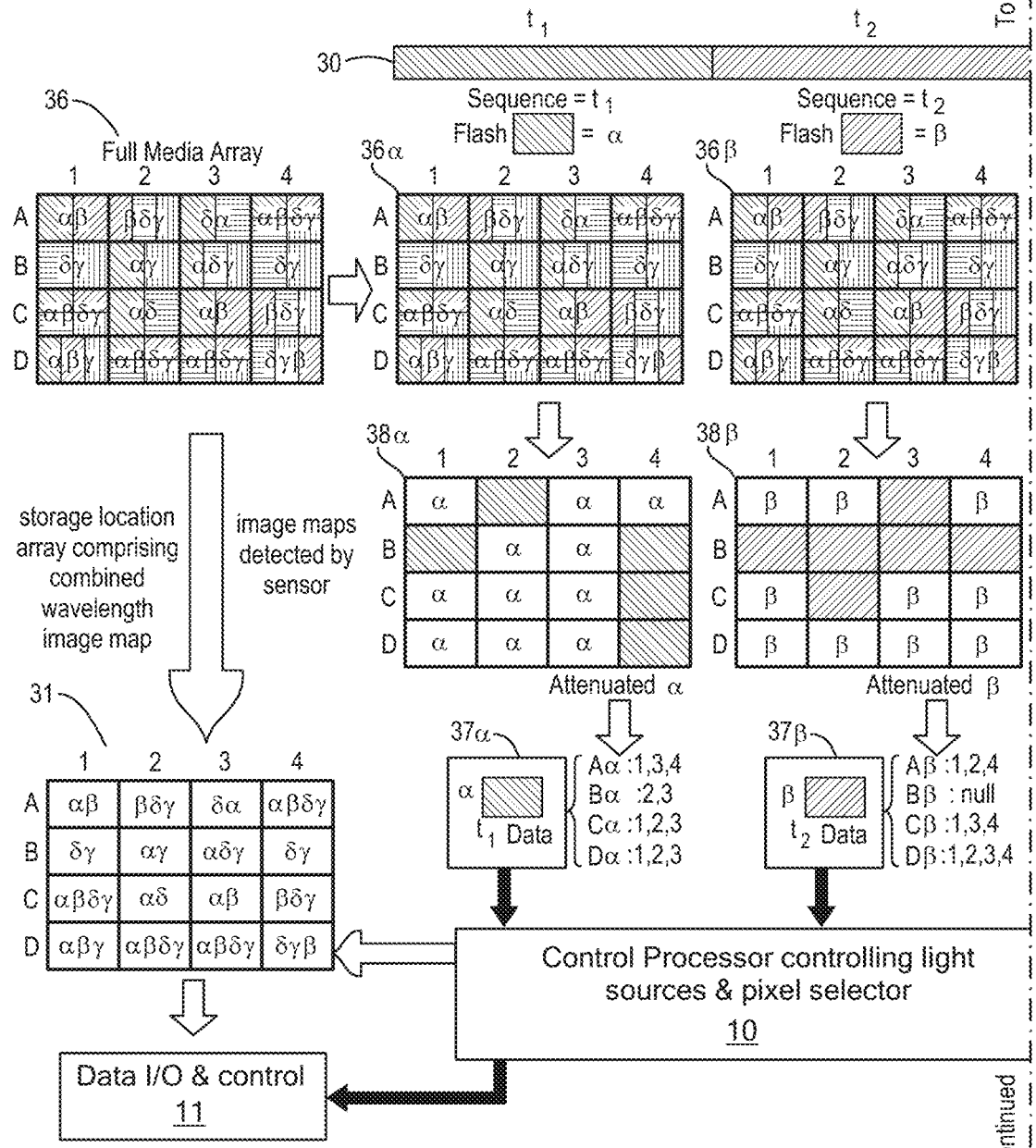
FIG. 3 is a diagram depicting an example of how the sequential wavelength illuminator separates the wavelengths for the data processor to store data in accordance with an embodiment of the present invention.
Figure 3:
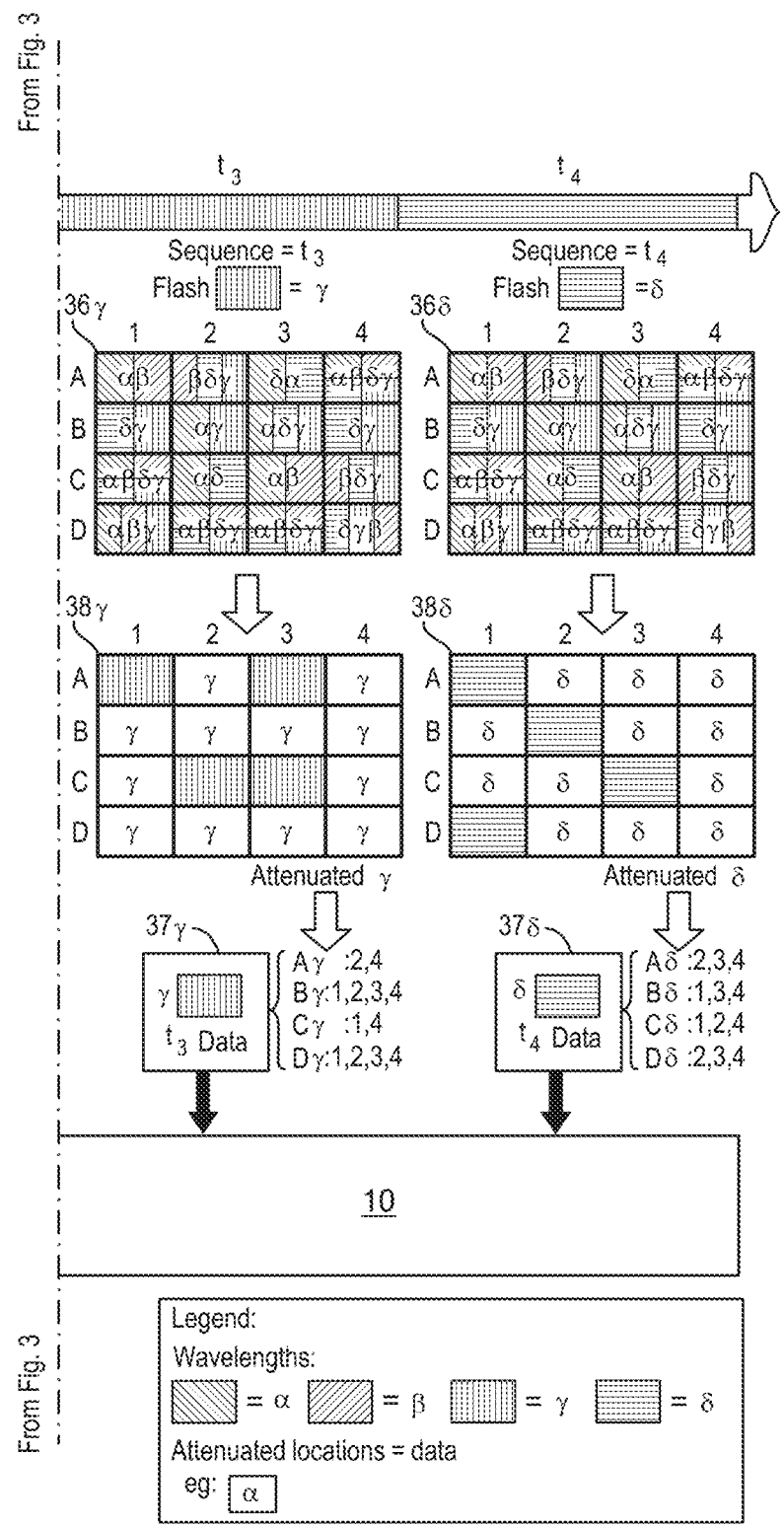

In a related embodiment for reading, in accordance with an embodiment of the present invention, FIG. 3 depicts an example of how the sequential wavelength illuminator separates the wavelengths for the data processor for reading data in the optical data storage medium layer, for the exposure time sequence 30 illuminating sensor layer sequence 37α ... δ. In this example, four unique narrowband wavelengths α ... δ (shown as, backward slanting hatches, forward slanting hatches, vertical hatches, and horizontal hatches) are selected out of a palette of n wavelengths. Wavelengths α ... δ are embedded as standing waves in optical data storage medium layer 36. The colored boxes in optical data storage medium 36 (i.e., 36 α . . . δ) indicate which combined standing waves are at each pixel location 31. Light sources 3a . . . 3n (not shown here) transmits light through pixel selector layer 5 (not shown here), on which developed optical data storage medium layer 36 is deposited on its rear (output) surface. Light is emitted sequentially $t_1 \ldots t_4$ for each wavelength α . . . δ yielding image maps 38α . . . 38δ. For clarity herein, an image map is repeated for each sequential time block of wavelengths α . . . δ. For reading the data image maps 38α . . . 38δ are detected sequentially by sensor layer 37, shown as four separate sensor time blocks 37α . . . 37δ (sensor layer 37 is equivalent to sensor 7 as in FIGS. 1 and 2). When optical data storage medium layer 36 is illuminated by an unique transmitted wavelength n, if that unique wavelength is embedded at a pixel location then its energy is attenuated due to the notch filtering mechanism. Processor 10 establishes a threshold level to identify which pixel locations for each wavelength α . . . δ are attenuated and which are transparent. All other pixel locations which do not contain specified wavelength n transmit all the other lightwaves in sequence $t_1 \ldots t_4$, as emitted by the light sources. Sequentially, sensor layer 37 captures a separate image for each wavelength α . . . δ representing a map of the illuminating wavelengths α . . . δ for each pixel location. These image maps of the attenuated pixel locations are stored for each wavelength α . . . δ in processor 10, which then applies permutation algorithms for reconstituting the data. The same procedure continues for each row at each time sequence $t_1 \ldots t_4$ until processor 10 reconstitutes all the data, as represented in image map 31, identical to the original data in optical data storage medium layer 36. The reconstituted data is output on I/O port 11.

In accordance with an embodiment of the present invention, FIGS. 4A and 4B represent exemplary illustrations for one embodiment of the invention for data storage, demonstrating the path of light from light sources 43α . . . β and 43β . . . δ, respectively, traveling through diffusion layer 2, beam director layer 4, and pixel selector layer 5 simultaneously to write two combined wavelengths in the form of standing waves at each pixel location 6αβ and 6βδ, respectively, in optical data storage medium layer 6.

Figure 5:
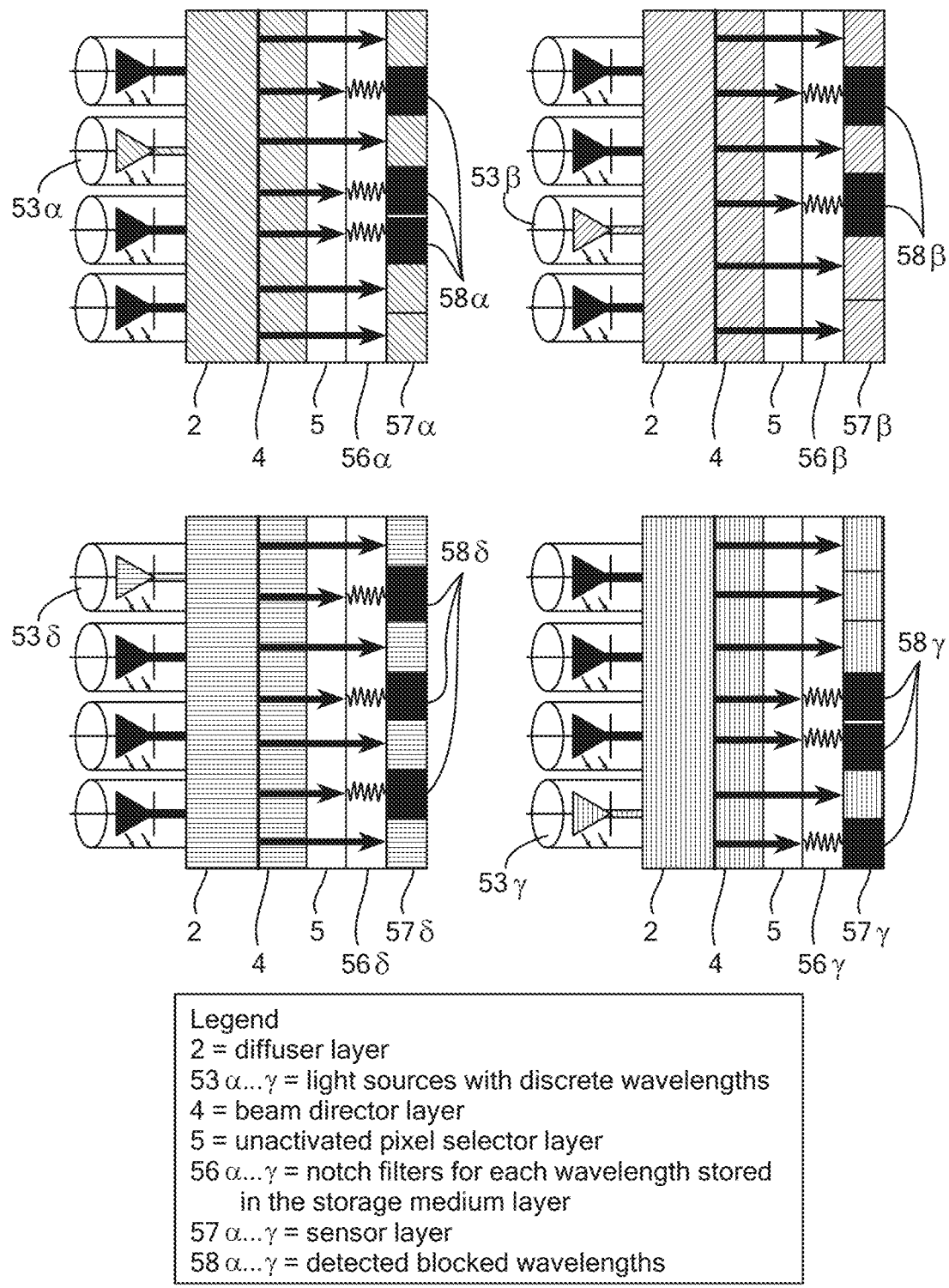
FIG. 5 is an exemplary illustration demonstrating the path of light to the sensor for select wavelengths, wherein select standing waves, acting as notch filters, attenuate only those wavelengths stored at those locations in accordance with an embodiment of the present invention.

In accordance with an embodiment of the present invention, FIG. 5 represents exemplary illustrations for one embodiment of the invention for reading, demonstrating the path of light from each sequentially illuminated unique wavelength light sources 53α . . . γ. Light travels through diffusing layer 2, beam director layer 4, and optical data storage medium layer 56α . . . γ to sensor layer 57α . . . γ. Optical data storage medium layer 56α . . . γ contains select standing waves, acting as notch filters, which attenuate only those wavelengths 58α . . . γ, stored as an image map. Sensor 57α . . . γ detects the attenuated image maps 58α . . . γ to be stored in the processor 10 (not shown) for that specific wavelength. Pixel selector layer 5 is transparent in this embodiment.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of storing digital data in a light-transmissive optical data storage sandwich medium layer, the method comprising:
   receiving the digital data;
   parsing the digital data into successive packets to be stored in the light transmissive optical data storage sandwich medium layer;
   processing the successive packets (i) to select successive sets of wavelengths to be used in encoding successive pixels associated with the successive packets, and (ii) to identify a set of distinct pixel locations in the light-transmissive optical data storage medium layer corresponding to each distinct one of the successive sets of wavelengths, so that each distinct pixel location is associated with an assigned set of wavelengths;
   for each selected set of the successive sets of wavelengths, (a) establishing a mask of the light-transmissive optical data storage medium layer to allow exposure only of pixel locations assigned to such selected set of the successive sets of wavelengths, and (b) exposing the light-transmissive optical data storage medium layer through the mask using light of such distinct one of the successive sets; and,
   in the course of exposing the light-transmissive optical data storage medium layer, doing so in a manner wherein light standing waves are formed in the light transmissive optical data storage medium layer.

2. A method according to claim 1, wherein exposing the light-transmissive optical data storage medium layer includes adjusting the exposure for each wavelength to compensate for the sensitivity of the medium to different wavelengths.

3. A light-transmissive optical digital data storage medium layer exposed according to the method of claim 1.

4. A light-transmissive optical digital data storage medium layer exposed according to the method of claim 2.

5. A method of reading digital data recorded in a light-transmissive optical data storage medium layer, the method comprising:
   sequentially illuminating light sources for each set of wavelength-encoded digital data in the light-transmissive optical data storage medium layer;
   processing selected successive sets of preselected wavelengths used to encode pixel locations during data storage according to the method of claim 1;
   for each of the pre-selected wavelengths, specifying which pixel locations, by means of stored standing waves in the light-transmissive optical data storage medium layer, acting as a notch filter to attenuate such pre-selected wavelength;
   using a sensor layer to capture specifically a distinct stored image map for each of the pre-selected wavelengths;
   using each distinct stored image map to reconstitute the original input data and to pass the reconstituted data to a data port.

6. A method according to claim 5 further comprising, for each of the preselected wavelengths, adjusting output levels to compensate for attenuation attributable artifacts including the notch filter and sensor layer at such pre-selected wave length.

7. A method according to claim 1, of storing digital data in a light-transmissive optical data storage sandwich medium layer, wherein the light-transmissive optical data storage sandwich medium layer is subjected to processing, including development, in such a manner as to form the sandwich medium layer into a Lippmann emulsion.

8. A method according to claim 1, of storing digital data in a light-transmissive optical data storage sandwich medium layer, wherein the light-transmissive optical data storage sandwich medium layer is a coating disposed on the mask in such a manner that light passing through the mask impinges on the coating.

9. A method according to claim 8, of storing digital data in a light-transmissive optical data storage sandwich medium layer, wherein the light-transmissive optical data storage sandwich medium layer is subjected to processing, including development, in such a manner as to form the sandwich medium layer as a Lippmann emulsion coating disposed on the mask.

* * * * *